(12) United States Patent
Dong

(10) Patent No.: US 10,856,558 B2
(45) Date of Patent: Dec. 8, 2020

(54) EXTRUSION DEVICE FOR ICE CREAM OR YOGURT MACHINE

(71) Applicant: Lingyu Dong, Temple City, CA (US)

(72) Inventor: Lingyu Dong, Temple City, CA (US)

( * ) Notice: Subject to any disclaimer, the term of this patent is extended or adjusted under 35 U.S.C. 154(b) by 78 days.

(21) Appl. No.: 16/136,219

(22) Filed: Sep. 19, 2018

(65) Prior Publication Data

US 2020/0085078 A1     Mar. 19, 2020

(51) Int. Cl.
*A23G 9/16*     (2006.01)
*A23G 3/02*     (2006.01)

(52) U.S. Cl.
CPC ............ *A23G 9/166* (2013.01); *A23G 3/0221* (2013.01)

(58) Field of Classification Search
CPC ................................ A23G 3/0221; A23G 9/20
USPC .............................. 141/82, 104, 285, 11, 100
See application file for complete search history.

(56) References Cited

U.S. PATENT DOCUMENTS

| | | | | |
|---|---|---|---|---|
| 2,210,366 A | * | 8/1940 | Godfrey .................... | A23G 9/20 62/69 |
| 2,376,298 A | * | 5/1945 | Welp ......................... | C02F 1/02 261/116 |
| 2,538,716 A | * | 1/1951 | Wakeman ................. | A23G 9/16 366/309 |
| 4,310,476 A | * | 1/1982 | Nahra ........................ | A23L 3/18 261/118 |

* cited by examiner

*Primary Examiner* — Jessica Cahill
*Assistant Examiner* — Christopher M Afful
(74) *Attorney, Agent, or Firm* — Raymond Y. Chan; David and Raymond Patent Firm

(57) ABSTRACT

An extrusion device for an ice cream or yogurt machine includes an air delivery channel and a material delivery channel individually extended along a tube body, wherein the air delivery channel and the material delivery channel are arranged for concurrently delivering a flow of air and a flow of raw material. A diameter size of the air delivery channel is smaller than that of the material delivery to match with viscosities of air and raw material.

21 Claims, 5 Drawing Sheets

EXTRUSION DEVICE FOR ICE CREAM OR YOGURT MACHINE

NOTICE OF COPYRIGHT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE PRESENT INVENTION

Field of Invention

The present invention relates to ice cream or yogurt machine, and more particularly to an extrusion device for an ice cream or yogurt machine, which can effectively enhance the extrusion rate of the frozen product.

Description of Related Arts

A conventional swirl machine, such as an ice cream making apparatus, usually comprises an extrusion tube connected to a freezing cavity, wherein the extrusion tube is arranged for introducing air into raw material before mixing and freezing in the freezing cavity. The air content, known as overrun, is varied from 10% to 60% of the total volume of the frozen product. Accordingly, a ratio of air and raw material is one of the important factors in order to produce the frozen product that is softer and less dense than the ice cream. The ratio is known as an extrusion rate regarding the volume of the raw material and the volume of the raw material with air. Frozen product with low quantities of air has a heavy and icy taste while frozen product with high quantities of air tastes creamier, smoother and lighter. In other words, the amount of air will change the taste of the frozen product.

A conventional extrusion tube comprises an elongated tube body and a feeding channel extended within the tube body, wherein the feeding channel has an air inlet, a material inlet, and a delivery outlet connected to the freezing cavity. In particular, the air inlet and the material inlet are communicatively connected to an air source and a material source respectively. During operation, raw material is initially introduced into the feeding channel from the material inlet to the delivery outlet. Once the delivery of the raw material is completed, air is then introduced into the feeding channel from the air inlet to the delivery outlet. Then, air and raw material are mixed and frozen to form the frozen product.

The major drawback of the extrusion tube is that air and the raw material are shared at the same feeding channel. Since the viscosity of air is different from that of raw material, the raw material may block the flow of air along the feeding channel to the delivery outlet. When enlarging the diameter size of the feeding channel, the flow of raw material can be increased. On the other hand, relative large amount of air may be introduced into the feeding channel to mix with the raw material therewithin. In addition, the air may return back to the tube body from the freezing cavity, which will affect the extrusion rate of the frozen product. When reducing the diameter size of the feeding channel to control the amount of air being passed therethrough, the flow of raw material may be blocked at the feeding channel.

SUMMARY OF THE PRESENT INVENTION

The invention is advantageous in that it provides an extrusion device for an ice cream or yogurt machine, which can substantially deliver a flow of air and a flow of raw material to be mixed and frozen, so as to effectively enhance the extrusion rate of the frozen product.

Another advantage of the invention is to an extrusion device for an ice cream or yogurt machine, which comprises two individual delivery channels to concurrently deliver air and raw material.

Another advantage of the invention is to an extrusion device for an ice cream or yogurt machine, wherein a diameter size of the air delivery channel is smaller than that of the material delivery to match with viscosities of air and raw material.

Another advantage of the invention is to an extrusion device for an ice cream or yogurt machine, wherein the flow rates of the air and raw material can be adjustably controlled via the delivery channels.

Another advantage of the invention is to an extrusion device for an ice cream or yogurt machine, wherein the diameter size of the air delivery channel is substantially small to prevent any air being returned back to the air delivery channel after air delivery.

Another advantage of the invention is to provide an extrusion device for an ice cream or yogurt machine, wherein the extrusion device can be incorporated with any existing ice cream or yogurt machine.

Another advantage of the invention is to provide an extrusion device for an ice cream or yogurt machine, which does not require altering the original structural design of the ice cream or yogurt machine, so as to minimize the manufacturing cost of the ice cream or yogurt machine that incorporates the extrusion device.

Another advantage of the invention is to provide an extrusion device for an ice cream or yogurt machine, wherein no expensive or complicated structure is required to employ the present invention in order to achieve the above mentioned objectives. Therefore, the present invention successfully provides an economic and efficient solution for concurrently delivering air and raw material to be mixed and frozen to produce the frozen product and for enhancing the extrusion rate of the frozen product.

Additional advantages and features of the invention will become apparent from the description which follows, and may be realized by means of the instrumentalities and combinations particular point out in the appended claims.

According to the present invention, the foregoing and other objects and advantages are attained by an extrusion device for an ice cream or yogurt machine, comprising:

a tube body;

an air delivery channel extended along the tube body, wherein the air delivery channel has an air outlet and an air inlet adapted for connecting to an air source for introducing a flow of air from the air inlet to the air outlet through the air delivery channel; and a material delivery channel extended along the tube body, wherein the material delivery channel has a material outlet and a material inlet adapted for connecting to a material source for introducing a flow of raw material from the material inlet to the material outlet through the material delivery channel, wherein a diameter size of the air delivery channel is smaller than that of the material delivery channel, wherein the material delivery channel is individual and spaced apart from the air delivery channel to enable the air and raw material being introduced at the same time.

In accordance with another aspect of the invention, the present invention comprises a method of manufacturing an extrusion device for an ice cream or yogurt machine, comprising the steps of:

(a) forming a tube body;

(b) forming an air delivery channel along the tube body for delivering a flow of air; and (c) forming a material delivery channel along the tube body for delivering a flow of raw material, wherein a diameter size of the air delivery channel is smaller than that of the material delivery channel, wherein the material delivery channel is individual and spaced apart from the air delivery channel to enable the air and raw material being introduced at the same time.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 4 of the drawings, an extrusion device for an ice cream or yogurt machine according to a preferred embodiment of the present invention is illustrated. Accordingly, the extrusion device is connected to a frozen cavity 11 of the ice cream or yogurt machine to deliver a flow of air and a flow of raw material into the frozen cavity 11, such that the air and raw material are mixed and frozen in the frozen cavity 11 to form a frozen product, such as ice cream or yogurt. The raw material can be a milk-based product or the like.

According to the preferred embodiment, the extrusion device comprises a tube body 20 and a delivery arrangement built-in with the tube body 20. The delivery arrangement comprises two individual delivery channels formed within the tube body 20 for concurrently delivering the air and raw material respectively. One of the delivery channels is an air delivery channel 30 and another delivery channel is a material delivery channel 40.

Figure 1:
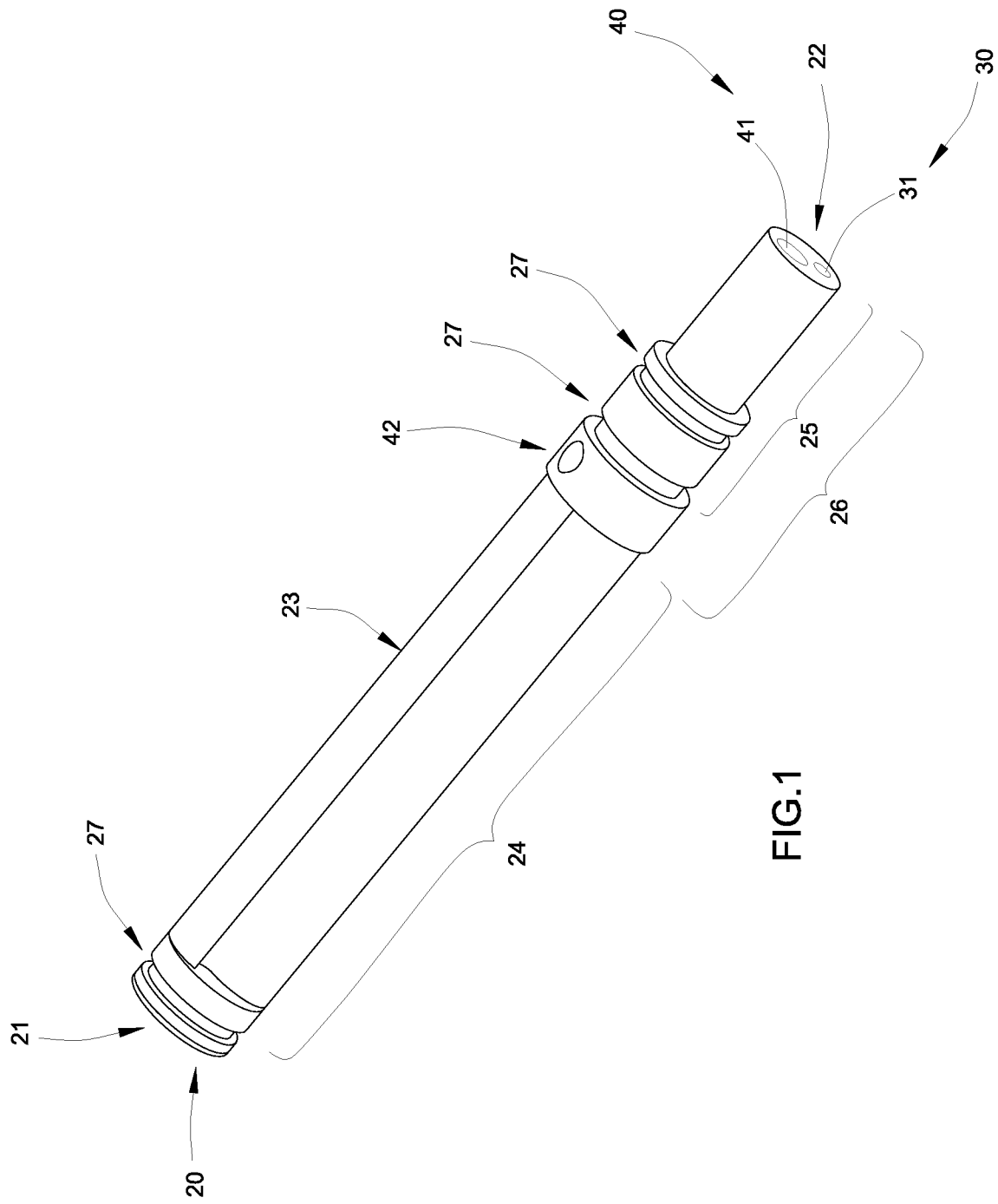
FIG. 1 is a perspective view of an extrusion device of an ice cream or yogurt machine according to a preferred embodiment of the present invention.
Figure 2:
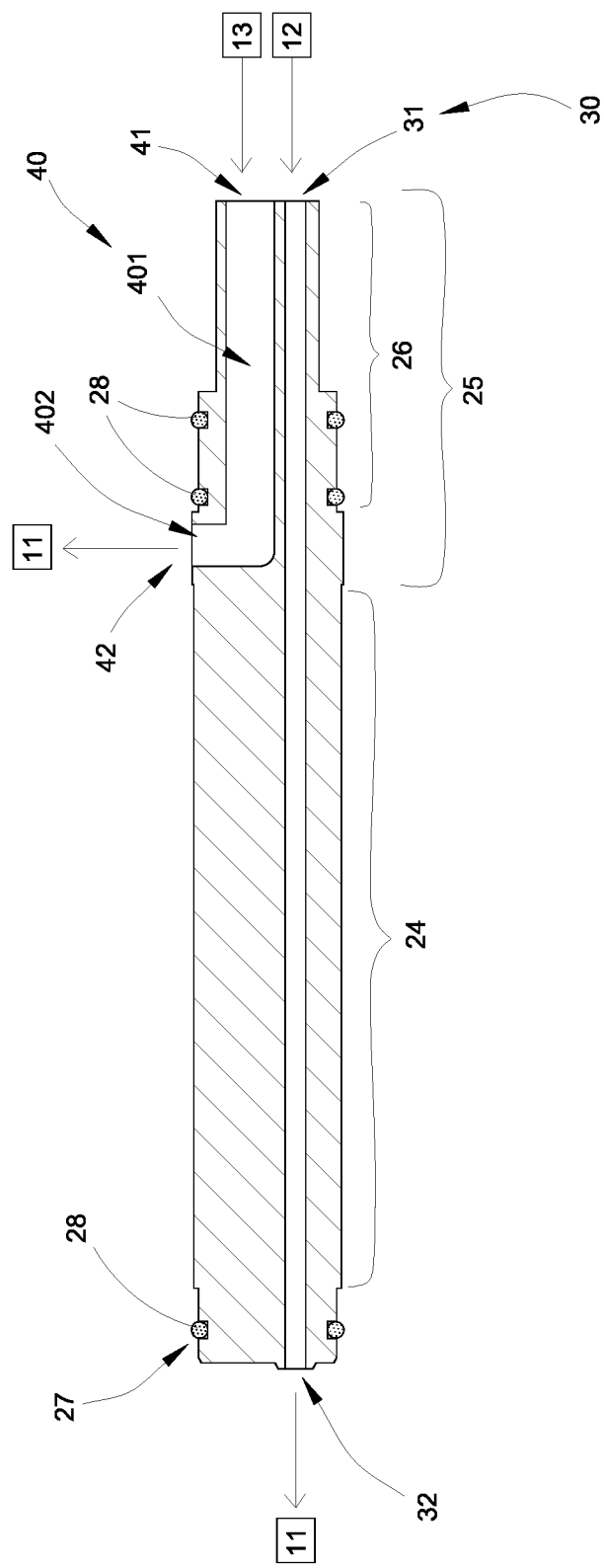
FIG. 2 is a sectional view of the extrusion device according to the above preferred embodiment of the present invention.
Figure 3:
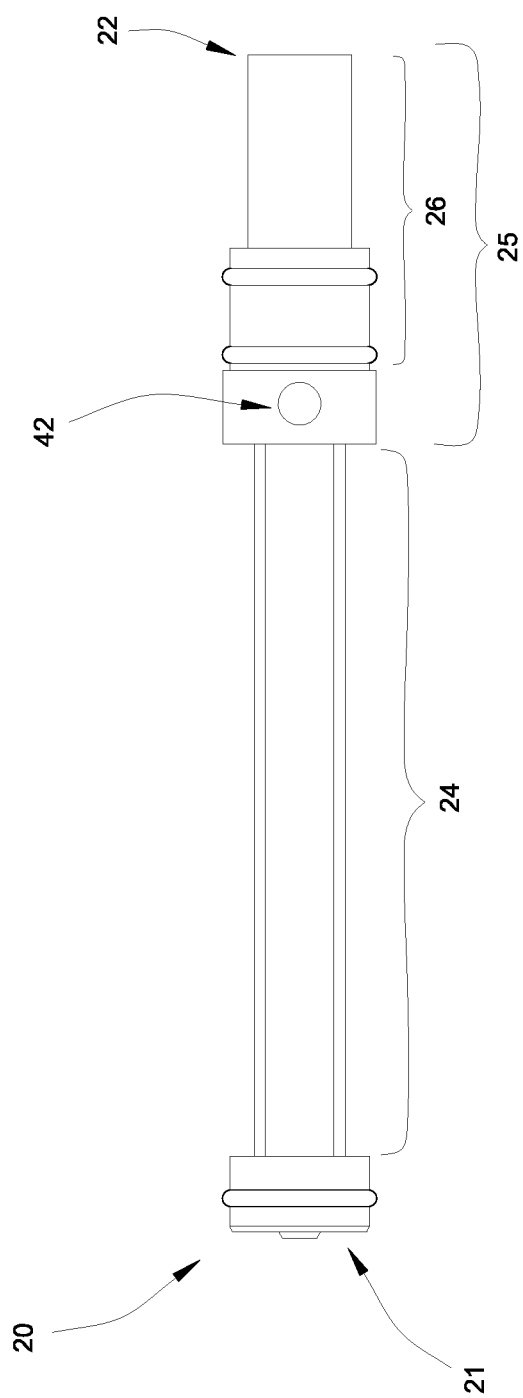
FIG. 3 is a top view of the extrusion device according to the above preferred embodiment of the present invention.

As shown in FIGS. 1 to 3, the tube body 20 has an elongated straight tube configuration defining a first end 21, an opposed second end 22, and a circumferential wall 23 extended between the first end 21 and the second end 22. Furthermore, the tube body 20 further has a first body portion 24 defining the first end 21 thereat and a second body portion 25 defining the second end 22 thereat, wherein the first body portion 24 and the second body portion 25 are coaxially extended with each other. A length of the first body portion 24 is longer than a length of the second body portion 25. In one embodiment, the length of the first body portion 24 is longer than a half length of the tube body 20. In other words, the length of the second body portion 25 is shorter than the half length of the tube body 20.

The air delivery channel 30 is coaxially extended end-to-end and is extended along the tube body 20 at an axial direction thereof. Particularly, the air delivery channel 30 has an air inlet 31 and an air outlet 32. The air inlet 31 of the air delivery channel 30 is formed at the second end 22 of the tube body 20 and is arranged to connect to an air source 12 for introducing the air from the air inlet 31 to the air outlet 32. The air outlet 32 of the air delivery channel 30 is formed at the first end 21 of the tube body 20 to communicate with the frozen cavity 11. The air source 12 can be an air pump to pump the air into the air delivery channel 30 or a compression air valve to release a compression air into the air delivery channel 30. In other words, the air outlet 32 of the air delivery channel 30 is coaxially aligned with the air inlet 31 thereof. The air delivery channel 30 also has a uniform diameter from the air inlet 31 to the air outlet 32. Furthermore, a length of the air delivery channel 30 is the same as a length of the tube body 20 as the air inlet 31 and the air outlet 32 are formed at the second end 22 and the first end 21 of the tube body 20 respectively.

The material delivery channel 40 has a material inlet 41 and a material outlet 42. The material inlet 41 of the material delivery channel 40 is formed at the second end 22 of the tube body 20 to connect to a material source 13, wherein the material inlet 41 is located adjacent to the air inlet 31 of the air delivery channel 30. The material outlet 42 of the material delivery channel 40 is formed at the circumferential wall 23 of the tube body 20, wherein the material outlet 42 of the material delivery channel 40 is connected to the frozen cavity 11. In other words, the material delivery channel 40 is non-coaxially extended end-to-end that the material outlet 42 of the material delivery channel 40 is non-coaxially aligned with the material inlet 41 thereof.

As shown in FIG. 2, the material delivery channel 40 has an entrance portion 401 and an exit portion 402, wherein the exit portion 402 is transversely extended from the entrance portion 401. The material inlet 41 is defined at the entrance portion 401 and the material outlet 42 is defined at the exit portion 402. Accordingly, the exit portion 402 of the material delivery channel 40 is extended at a radial direction of the tube body 20. The entrance portion 401 of the material delivery channel 40 is extended at an axial direction of the tube body 20. Preferably, the exit portion 402 of the material delivery channel 40 is extended 90° from the entrance portion 401 thereof to form a L-shaped channel.

Preferably, the material delivery channel 40 is formed at the second body portion 25 of the tube body 20. In addition, a diameter size of the exit portion 402 of the material delivery channel 40 is smaller than the entrance portion 401 thereof. Therefore, when the raw material is introduced into the material delivery channel 40, the initial speed at the entrance portion 401 of the material delivery channel 40 will be increased at the cornering (turning point) between the entrance portion 401 and the exit portion 402. Importantly, the speed of the raw material will be increased toward the exit portion 402 thereof to enter into the frozen cavity 11 as the diameter difference between the entrance portion 401 and the exit portion 402. Since the length of the material delivery channel 40 is relatively short, the raw material will not be easily stuck at the material delivery channel 40.

Figure 5:
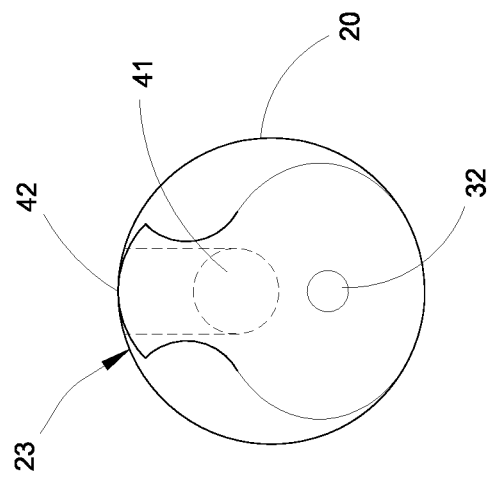
FIG. 5 is a cross sectional view of the first body portion of the extrusion device according to the above preferred embodiment of the present invention.
Figure 4:
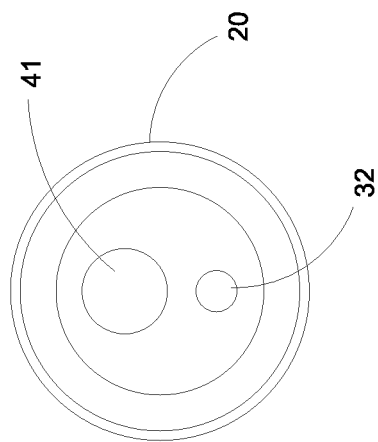
FIG. 4 is a side view of the extrusion device according to the above preferred embodiment of the present invention.

Furthermore, a diameter size of the first body portion 24 is smaller than that of the second body portion 25. In one embodiment, the first body portion 24 has a non-circular cross section, as shown in FIG. 5, and the second body portion 25 has a circular cross section, such that the material of the tube body 20 will be minimized. Since the material delivery channel 40 is formed at the second body portion 25 of the tube body 20, the size of the first body portion 24 of the tube body 20 will be minimized especially with the small diameter size of the air delivery channel 30.

As it is mentioned above, the air and raw material are concurrently delivered to the frozen cavity 11 along the air delivery channel 30 and the material delivery channel 40 respectively. The air can be continuously delivered to the frozen cavity 11 when mixing and freezing the mixture of air and raw material in the frozen cavity 11 to control extrusion rate of the frozen product.

The traveling distance of the air delivery channel 30 is longer than that of the material delivery channel 40, such that the air traveling along the air delivery channel 30 is longer than the raw material traveling along the material delivery channel 40. Since the viscosity of the air is different from that of the raw material, the air can travel faster than the raw material even the air must travel longer path.

Moreover, the air delivery channel 30 has a uniform diameter while the material delivery channel 40 has a varied diameter. The diameter size of the air delivery channel 30 is smaller than that of the material delivery channel 40 to match with viscosities of air and raw material. Having a smaller diameter, the traveling speed of air can maintain along the air delivery channel 30 from the air inlet 31 to the air outlet 32. As the larger diameter of the material delivery channel 40, the raw material can be smoothly delivered from the material inlet 41 to the material outlet 42 to prevent any blockage of the raw material at the material delivery channel 40. The reducing the diameter size of the air delivery channel 30 will prevent the air within the frozen cavity 11 being leaked and returned back to the air delivery channel 30. In other words, the extrusion tube of the present invention can keep the air pressure within the frozen cavity 11.

According to the preferred embodiment, the tube body 20 further comprises an inserting section 26 formed at the second body portion 25 and extended to the second end 22 of the tube body 20, wherein the inserting section 26 of the tube body 20 is arranged to insert into the frozen cavity 12 to ensure the air outlet 32 and the material outlet 42 communicating therewith. A diameter size of the inserting section 26 is smaller than that of the second body portion 25. Accordingly, the frozen cavity 11 has an inserting channel, wherein the inserting section 26 is slidably inserted into the inserting channel to retain the air outlet 32 and the material outlet 42 within the frozen cavity 11.

The tube body 20 further comprises a plurality of engaging ribs 27 formed at the circumferential wall 23 of the tube body 20 and a plurality of sealing rings 28. Accordingly, the engaging ribs 27 are spacedly indent on the circumferential wall 23 of the tube body 20. In one embodiment, at least one engaging rib 27 is formed at the first body portion 24 of the tube body 20 close to the first end 21 thereof. Two or more engaging ribs 27 are spacedly formed at the inserting section 26 of the tube body 20 close to the material outlet 42. The sealing rings 28 are coupled at the engaging ribs 27 respectively. Accordingly, when the inserting section 26 of the tube body 20 is inserted into the inserting channel, the sealing rings 28 are sealed and engaged with a surrounding wall of the inserting channel to seal the tube body 20 at the frozen cavity 11.

Figure 6:
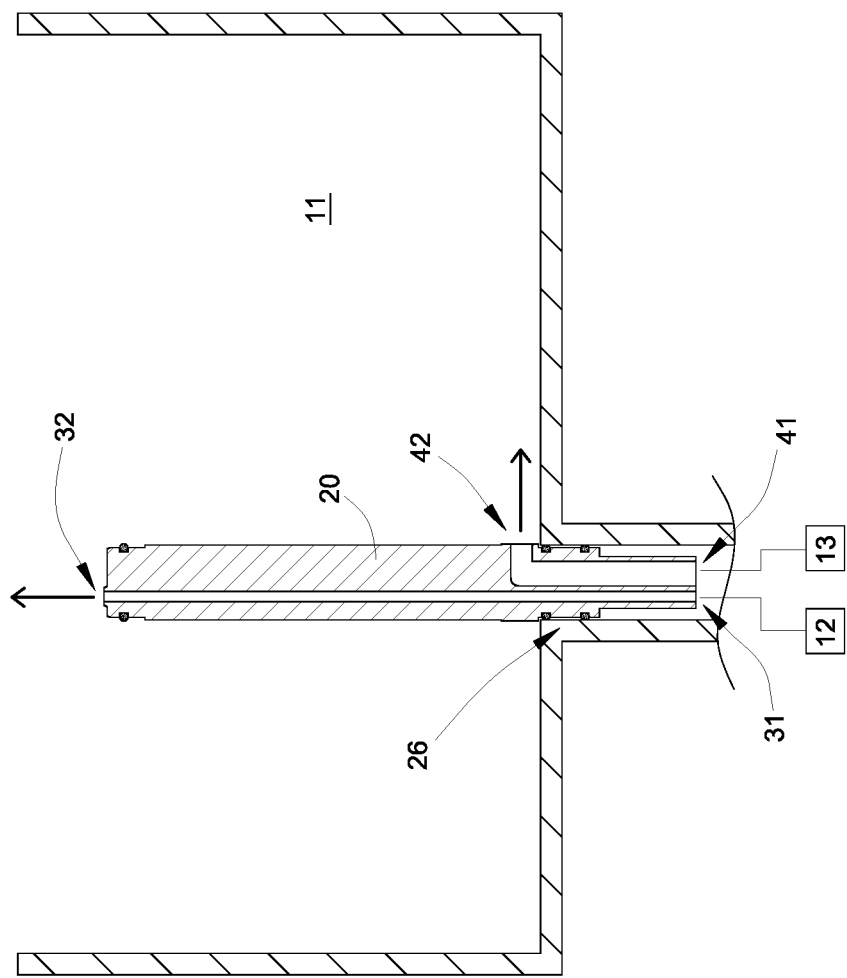
FIG. 6 illustrates the extrusion device installed at the frozen cavity according to the above preferred embodiment of the present invention.

FIG. 6 illustrates the extrusion device of the present invention being installed into the frozen cavity 11. In one embodiment, the tube body 20 is vertically supported within the frozen cavity 11 when the inserting portion 26 of the tube body 20 is inserted into the inserting channel of the frozen cavity 11. As the vertical orientation of the tube body 20, the air outlet 32 is located at a top portion of the frozen cavity 11 while the material outlet 42 is located at a bottom portion of the frozen cavity 11. In addition, when introducing the air and the raw material into the frozen cavity 11, the air will be vertically introduced into the frozen cavity 11 while the raw material will be sidewardly introduced into the frozen cavity 11. Therefore, the air and raw material will be delivered into the frozen cavity 11 at different directions and at different portions of the frozen cavity 11.

The present invention further provides a method of manufacturing the extrusion device, which comprises the following steps.

(1) Form the tube body 20.

(2) Form the air delivery channel 30 along the tube body 20 for delivering a flow of air. Accordingly, the air delivery channel 30 is extended along the tube body 20 at the axial direction thereof.

(3) Form the material delivery channel 40 along the tube body 20, wherein the diameter size of the air delivery channel 30 is smaller than that of the material delivery channel 40. Accordingly, the exit portion 402 of the material delivery channel 40 is configured to extend at the radial direction of the tube body 20. The entrance portion 401 of the material delivery channel 40 is configured to extend at the axial direction of the tube body 20.

The operation of the extrusion device of the present invention comprises the following steps.

(A) Connect the tube body 20 of the extrusion device at a position that (i) the air inlet 31 of the air delivery channel 30 is connected to the air source 12, (ii) the material inlet 41 of the material delivery channel 40 is connected to the material source 13, and (iii) the second end 22 of the tube body 20 is connected to the frozen cavity 11 to communicate the air outlet 32 and the material outlet 42 therewith.

(B) Controllably adjust the air and raw material to be delivered into the frozen cavity 11 through the air delivery channel 30 and the material delivery channel 40 respectively.

It is worth mentioning that the air delivery channel 30 and the material delivery channel 40 are two individual channels to individually deliver the air and raw material to the frozen cavity 11 at the same time. Therefore, the amount of air and raw material can be controllably delivered to the frozen cavity 11. For example, after a predetermined volume of raw material with air are mixed and frozen in the frozen cavity 11, the air can be continuously delivered into the frozen cavity 11 until a desired extrusion rate of the frozen product is reached. In other words, the air and raw material can be selectively stopped to deliver into the frozen cavity 11 at any time through the air delivery channel 30 and the material delivery channel 40 respectively. Furthermore, since the diameter size of the tube body 20 is smaller than that of the conventional extrusion tube, especially the diameter size of the air delivery channel 30 is smaller than the channel of the conventional extrusion tube, the air pressure within the frozen cavity 11 can be maintained to prevent any air being leaked and returned back to the tube body 20 once the tube body 20 is connected thereto.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An extrusion device for an ice cream or yogurt machine having a frozen cavity, comprising: a tube body, which is arranged for being installed into the frozen cavity, wherein the tube body, which has a straight tube configuration, has a first body portion, a second body portion coaxially extended from said first body portion, a first end defined at said first body portion, and an opposed second end defined at said second body portion, wherein a length of said first body portion is longer than a length of said second body portion; an air delivery channel extended along said tube body from said first body portion to said second body portion, wherein said air delivery channel has an air outlet and an air inlet adapted for connecting to an air source for introducing a flow of air from said air inlet to said air outlet through said air delivery channel; and a material delivery channel extended along said tube body at said second body portion, wherein said material delivery channel has a material outlet and a material inlet adapted for connecting to a material source for introducing a flow of raw material from said material inlet to said material outlet through said material delivery channel, wherein a diameter size of said air delivery channel is smaller than that of said material delivery channel, wherein said material delivery channel is individual and spaced apart from said air delivery channel for enabling the air and raw material being introduced into the frozen cavity at the same time.

2. The extrusion device, as recited in claim 1, wherein a traveling distance of said air delivery channel is longer than that of said material delivery channel.

3. The extrusion device, as recited in claim 1, wherein said air inlet and said material inlet are spaced apart from each other and are formed at said second end of said tube body.

4. The extrusion device, as recited in claim 3, wherein said air outlet is formed at said first end of said tube body while said material outlet is formed at a circumferential wall of said tube body between said first end and said second end, wherein a diameter size of said first body portion is smaller than that of said second body portion.

5. The extrusion device, as recited in claim 1, wherein said air outlet of said air delivery channel is coaxially aligned with said air inlet thereof, such that said air delivery channel is coaxially extended end-to-end.

6. The extrusion device, as recited in claim 1, wherein said material outlet of said material delivery channel is non-coaxially aligned with said material inlet thereof, wherein said material delivery channel has a L-shaped configuration.

7. The extrusion device, as recited in claim 1, wherein said material delivery channel has an entrance portion defining said material inlet thereat, and an exit portion defining said material outlet thereat, wherein said exit portion is transverse to and extended from said entrance portion.

8. The extrusion device, as recited in claim 7, wherein a diameter size of said exit portion of said material delivery channel is smaller than said entrance portion thereof.

9. The extrusion device, as recited in claim 7, wherein said exit portion of said material delivery channel is extended 90° from said entrance portion thereof.

10. The extrusion device, as recited in claim 1, wherein said air delivery channel has a uniform diameter from said air inlet to said air outlet.

11. An extrusion device for an ice cream or yogurt machine having a frozen cavity, comprising:
    a tube body having a straight tube configuration for being inserted into the frozen cavity; and
    a delivery arrangement which comprises two individual delivery channels formed within said tube body for concurrently delivering a flow of air and a flow of raw material respectively, wherein one of said delivery channels having a smaller diameter size is configured as an air delivery channel while another said delivery channel having a larger diameter size is configured as a material delivery channel.

12. The extrusion device, as recited in claim 11, wherein a traveling distance of said air delivery channel is longer than that of said material delivery channel, wherein said tube body has a first body portion, a second body portion coaxially extended from said first body portion, a first end defined at said first body portion, and an opposed second end defined at said second body portion, wherein a length of said first body portion is longer than a length of said second body portion, wherein one of said delivery channels is extended along said tube body from said first body portion to said second body portion while another said delivery channel is extended along said tube body at said second body portion.

13. The extrusion device, as recited in claim 11, wherein said air delivery channel has a uniform diameter while said material delivery channel has a varied diameter.

14. A method of manufacturing an extrusion device for an ice cream or yogurt machine having a frozen cavity, comprising the steps of:
    (a) forming a tube body to have a straight tube configuration to be inserted into the frozen cavity;
    (b) forming an air delivery channel along said tube body for delivering a flow of air; and
    (c) forming a material delivery channel along said tube body for delivering a flow of raw material, wherein a diameter size of said air delivery channel is smaller than that of said material delivery channel, wherein said material delivery channel is individual and spaced apart from said air delivery channel to enable the air and raw material being introduced into the frozen cavity at the same time.

15. The method, as recited in claim 14, wherein a traveling distance of said air delivery channel is longer than that of said material delivery channel, wherein the step (a) further comprises a step of forming said tube body to have a first body portion, a second body portion coaxially extended from said first body portion, a first end defined at said first body portion, and an opposed second end defined at said second body portion, wherein a length of said first body portion is longer than a length of said second body portion, wherein, in the step (b), said air delivery channel is extended along said tube body from said first body portion to said second body portion, wherein, in the step (c), said material delivery channel is extended along said tube body at said second body portion.

16. The method, as recited in claim 14, wherein inlets of said air delivery channel and said material delivery channel are spaced apart from each other and are formed at said second end of said tube body.

17. The method, as recited in claim 14, wherein said air delivery channel is coaxially extended end-to-end such that said air delivery channel is coaxially extended end-to-end while said material delivery channel is non-coaxially extended end-to-end.

18. The method, as recited in claim 14, wherein said air delivery channel is extended along said tube body at an axial direction thereof, such that said air delivery channel is coaxially extended end-to-end.

19. The method, as recited in claim 14, wherein the step (c) further comprises the steps of:
  (c.1) configuring an exit portion of said material delivery channel at a radial direction of said tube body; and
  (c.2) configuring an entrance portion of said material delivery channel at an axial direction of said tube body.

20. The method, as recited in claim 19, wherein a diameter size of said exit portion of said material delivery channel is smaller than said entrance portion thereof.

21. The method, as recited in claim 19, wherein said exit portion of said material delivery channel is extended 90° from said entrance portion thereof, such that said material delivery channel has a L-shaped configuration.

* * * * *